Feb. 13, 1951     C. W. BRYAN     2,541,494
HYDRAULIC WHEEL JACK
Filed Nov. 21, 1947     2 Sheets—Sheet 1
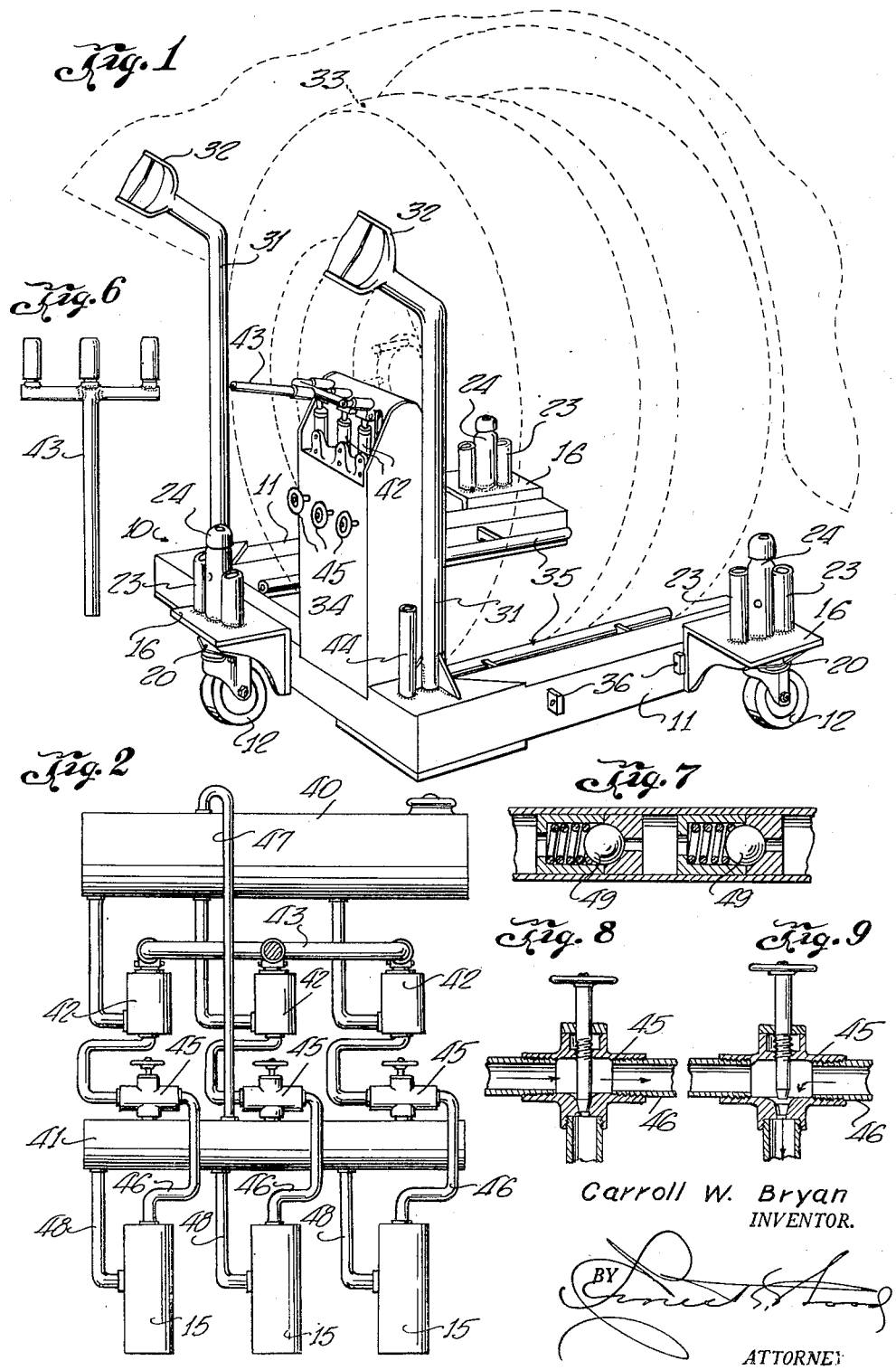
Carroll W. Bryan
INVENTOR.

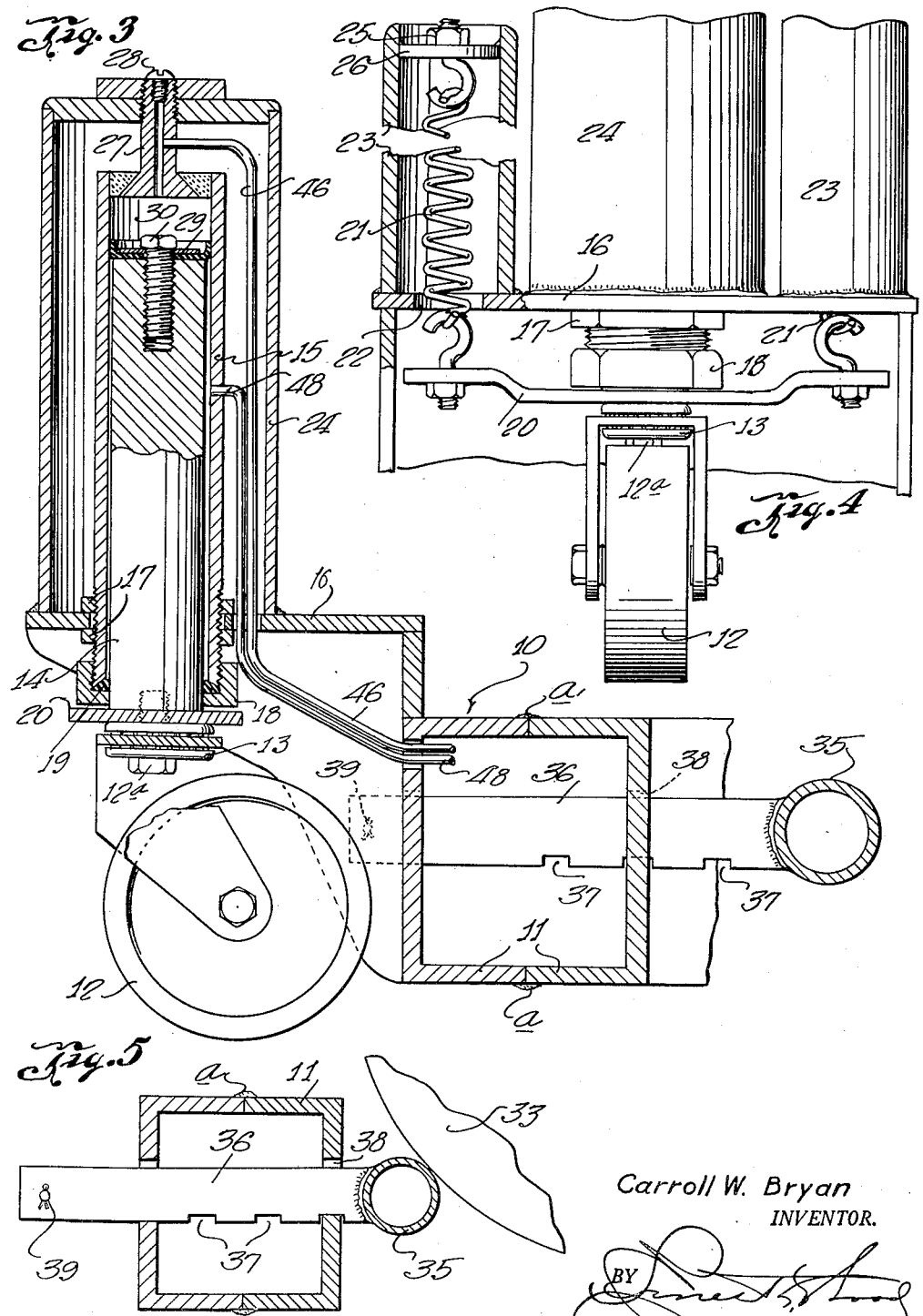

Patented Feb. 13, 1951

2,541,494

UNITED STATES PATENT OFFICE 2,541,494

HYDRAULIC WHEEL JACK

Carroll W. Bryan, Dallas, Tex.

Application November 21, 1947, Serial No. 787,427

6 Claims. (Cl. 214—1)

This invention relates to hydraulic jacks and it has particular reference to jacks for removing, replacing and otherwise handling vehicle wheels.

The principal object of the invention is to provide a jack designed to alleviate the labor in mounting and removing heavy duty wheels such as the dual wheels used on trucks, busses and like vehicles as well as tractor wheels, airplane wheels and those of other heavy equipment where alignment of the wheels with its axle requires the exercise of care to avoid injury to grease retainers, wheel bearings and brakes.

Another and equally important object of the invention is to provide a wheel jack consisting of a substantially U-shaped frame supported in parallelism with the floor on casters located at the rear and at each side and at which individual points the frame is capable of being raised and lowered in order to bring into alignment the hub of a wheel supported on the jack with its axle on a vehicle.

Another object of the invention is to provide a wheel jack whose simplified construction permits of unobstructed vision of a mechanic in aligning a wheel hub and axle whose hands are left free to manipulate controls effective to tilt the jack frame in any desired direction, as well as to move the jack towards and away from the axle when necessary.

Still another object of the invention is to provide a wheel jack having a pair of opposed and parallel wheel supporting bars adjustably mounted in the frame to accommodate wheels of various diameters.

Yet another object of the invention is to provide a wheel jack whose U-shaped, tiltable frame is equipped with a pair of uprights at the rear thereof serving the dual purpose of supporting a wheel preparatory to mounting or for transport and providing handles by which the jack may be conveniently moved from place to place.

With the foregoing and other objects in view, the invention has further reference to certain features of accomplishment which will become apparent as the description proceeds, taken in connection with the accompanying drawings wherein:

Figure 1 is a perspective view of a tiltable wheel jack constructed according to the present invention.

Figure 2 is a schematic diagram of the hydraulic system of the jack.

Figure 3 is a view in vertical section through one of the caster rams of the jack frame and showing the latter fragmentarily.

Figure 4 is a fragmentary elevational view of one of the caster rams, illustrating the caster and spring ram return.

Figure 5 is a transverse sectional view of one leg of the jack frame showing one of the wheel supporting bars.

Figure 6 is a detail view of the pump control handle.

Figure 7 is a fragmentary, longitudinal sectional view of the inlet or outlet tube of the pumps, showing tandem check valves used therein to minimize fouling of the hydraulic system.

Figure 8 is a detail sectional view of one of the hydraulic valves in closed position, and Figure 9 is a similar view showing open position of the valve.

Continuing with a more detailed description of the drawing, reference numeral 10 denotes generally a chassis or frame which may be fabricated in any suitable manner but, as shown, this frame is made up of channel members 11 whose confronting flanges are welded together at a (Fig. 3) to define a protective housing for the hydraulic lines of the jack, to be presently described.

As an expedient in locating a wheel with respect to a vehicle axle, the jack frame is designed in U-shape and has three suspension points through the medium of ball bearing casters 12, one of these being situated adjacent the outer end of each leg of the jack frame while another is located at the rear of the frame midway between the first casters. In so mounting the casters, they will conform to irregular floor surfaces and at the same time will provide a medium through which the frame may be tilted in any direction through the hydraulic system to be presently described.

Each of the casters 12 is connected by means of a screw 12a extending through a ball bearing 13, to the lower end of a hydraulic ram 14 which latter extends upwardly into a vertical cylinder 15. One of these cylinders is supported on each of three brackets 16 located at the suspension points of the frame 10 and is held secure thereon by means of lock nuts 17 threaded onto the lower end of the cylinder, one bearing on each side of the bracket 16 in the manner shown in Figure 3. A flanged nut 18 is threaded onto the lower extremity of the cylinder 15 and serves the purpose of compressing the packing 19 against the chamfered lower end of the cylinder 15. A cross-member 20 is retained between the lower end of the ram 14 and the caster 12 by means of the cap screw 12a.

To each end of the cross-member 20 is attached the lower end of a coil spring 21 (Fig. 4) which latter extends upwardly through an aperture 22 in the bracket 16 and into a cylindrical casing 23 affixed to the bracket 16 alongside and in parallelism with a cylindrical housing 24 which encloses the ram cylinder 15. There are two of the springs 21, one on each side of the ram cylinder 15 to exert a uniform downward thrust on the frame 10, once the fluid pressure in the ram cylinder 15 is relieved by valve means to be later described, the upper ends of the springs being secured at their upper ends in the upper ends of their respective casings 23 by means of a nut 25 bearing on a plate 26, as exemplified in Figure 4.

Each of the ram cylinders 15 has a nipple 27 in its upper end which extends through the top of the cylindrical casing 24 in which the cylinder 15 is housed and its upper end is closed by a bleeder plug 28.

The head of the ram 14 operating within the cylinder 15 carries a leather cup 29, the latter wiping the walls of the cylinder 15 and is affixed to the ram by means of a screw 30.

Rising from each rear corner of the jack frame 10 is an upright 31, the upper end of each being disposed at an angle to the vertical and carries a handle 32. These uprights serve the dual function of supporting wheels 33 inclined thereagainst and afford a medium by which the jack may be readily wheeled from place to place or adjusted into position to remove or replace a wheel on its axle.

Intermediate the uprights 31 is a housing 34 adapted to contain the hydraulic control mechanism of the jack. This housing, it will be observed in Figure 1, is disposed at one side of the center of the jack frame so that it will not obstruct the operator's vision of the center of a wheel supported on the frame to enable him to observe the relative positions of the wheel hub and axle while manipulating the controls of the hydraulic mechanism to bring about alignment of the wheel hub with the axle by tilting movements of the frame.

To support the wheel 33, there is provided a pair of bars 35, one being parallel with each leg of the jack frame. Each bar 35 has welded thereto a pair of spaced apart, parallel arms 36 of flat stock. These arms are each provided with relatively spaced notches 37 in their undersides for selective engagement with the lower edges of apertures 38 in the inner walls of the legs of the frame, as shown in Figure 5. The bars 35 are thus held in adjusted positions to support tires of different diameters. A cotter pin or equivalent means 39, limits inward displacement of the arms 36.

In Figure 2 is shown schematically the hydraulic system of the jack, which is encased in the housing 34 except, of course the various lines extending to the ram cylinders 15. This system consists of a fluid supply tank 40 and a fluid manifold 41. A series of pumps 42 are arranged in the upper portion of the housing 34 and are individually or collectively operated by means of a three pronged operating handle 43 (Fig. 6), the latter being removable for placement in a stock 44 at one side of the housing 34 when not in use.

Since all of the hydraulic units operate the same, the course of fluid in but one of these units will be described, it being obvious that the operation of one will tilt the jack frame in one direction while simultaneous operation will raise all sides of the frame uniformly. To operate one of the pumps 42, the position of the handle 43 is reversed from that shown in Figure 1 and a piston of a selected pump is reciprocated thereby after first closing the corresponding lowering valve 45. Fluid is drawn from the supply tank 40 and is forced through the lowering valve 45, in the position shown in Figure 8, thence into the top of the ram cylinder 15 through the high pressure line 46. The building up of pressure in the head of the cylinder 15 will exert an upward force thereon effect to lift the frame 10 at this point. When the frame rises, a predetermined distance, fluid will escape through by-pass line 48 (Fig. 3) to suspend further upward travel of cylinder 15 at a point predetermined by the position of the port in the cylinder 15, by which fluid enters and emerges from the line 48, such by-passing of fluid being effective to prevent the cylinder 15 from being forced completely off the ram 14. Fluid by-passed through line 48 in the manner described is returned to the manifold 41 and thence back to the supply tank 40 through line 47.

When it is desired to lower the frame at any point, the selected valve 45 is opened, as in Figure 9, permitting fluid to return to the manifold 41 from the ram cylinder 15 through the high pressure line 46 and back to the supply tank by way of the return line 47. The frame is slowly lowered as the fluid emerges from the ram cylinder, as described.

Dual or tandem check valves 49 (Fig. 7) are employed in both the inlet and outlet of the pumps 42 since most hydraulic failures are caused by check valves becoming fouled with foreign matter entrained with the oil. The dual valves are more or less self flushing and they rarely foul at the same time, thus insuring longer periods of efficient operation of the system.

There are many various types of wheel jacks and many of these jacks are possessed of U-shaped frames or chassis. However, for the most part, the wheels adapted to be handled by these jacks are actuated by wheel supports movable independently of the frame by various means and therefore, there is no need for changing the elevation of the frame in relation to the floor. Indeed, a greater degree of flexibility may be had with considerable lessening of appurtenances where the wheel is directly supported on a simple and sturdy frame, capable of being raised and lowered at three independent points of suspension by hydraulic means, as herein described, or by any suitable form of mechanical means. In this manner, an operator, without effort on his part may shift an extremely heavy bus or truck wheel or dual wheels either vertically or laterally to direct the hub of the wheel onto the axle of the vehicle.

Manifestly, the construction as shown and described is capable of some modification and such modification as may be construed to fall within the scope and meaning of the appended claims is also considered to be within the spirit and intent of the invention.

What is claimed is:

1. A hydraulic wheel jack including substantially U-shaped, horizontal frame, a cylinder at the forward end of each leg of said frame and at the midsection of the rear thereof, a ram in each of said cylinders, a fluid supply tank, a fluid manifold, a pump common to each of said cylinders, selectively operated valves for forcing fluid under pressure of said pumps from said supply tank to said cylinders through hydraulic lines to predeterminately tilt said frame, spring means acting against the pressure of said fluid to lower said frame, means for relieving pressure of fluid in said cylinders and adjustable means for supporting a wheel intermediate the legs of said frame.

2. The structure as set forth in claim 1, further defined in that the wheel supporting means is movable with the frame to align the hub of a wheel thereon with the axle of a vehicle.

3. A wheel jack including a substantially U-shaped, horizontal frame supported at three equidistantly spaced points on casters, an hydraulic cylinder mounted perpendicularly on said frame above said casters, a ram slidably disposed in each cylinder and carrying a frame supporting caster, means for circulating fluid under pressure through each of said cylinders for raising and lowering said frame at each of said supporting points individually and collectively, a bar supported by and disposed in parallelism with the inner face of each leg of said frame and independently adjustable for supporting a wheel relative to a vehicle axle.

4. In a jack for mounting and demounting vehicle wheels, a substantially U-shaped and horizontal frame, a hydraulic cylinder at the extremities of the legs of said frame and at the midsection of the rear thereof, a ram in each of said cylinders, a caster mounted on each of said rams and supporting said frame, a bar alongside the inner face of each leg of said frame, a notched arm adjacent each end of said bar and extending slidably in openings in said frame leg for lateral adjustment of said bar with respect to said leg, said bars jointly defining adjustable vehicle wheel supports and means for circulating fluid under pressure in said cylinders selectively and collectively to align the hub of a wheel on said supporting means with a vehicle axle.

5. In a wheel jack, a substantially U-shaped and horizontal frame, hydraulic rams supporting the forward portion and the midsection of the rear portion of said frame, vehicle wheel supports independently adjustable in relation to the legs of said frame, said vehicle wheel supports each consisting of a bar having notched arms slidable in apertures in the legs of the jack frame and held in adjusted positions by the notches in said arms, and means for selectively actuating said rams to tilt said frame.

6. A wheel jack as set forth in claim 5, further defined in that uprights are disposed in spaced apart relationship at the rear of the frame to support a vehicle wheel inclined thereon and by which said frame is manipulated.

CARROLL W. BRYAN.

REFERENCES CITED

The following references are of record in the file of this patent:

UNITED STATES PATENTS

| Number | Name | Date |
| --- | --- | --- |
| 1,847,382 | Collins | Mar. 1, 1932 |
| 2,045,524 | Fehrmann | June 23, 1936 |
| 2,362,981 | Baum | Nov. 21, 1944 |
| 2,364,918 | Roberson | Dec. 12, 1944 |
| 2,379,587 | Moore | July 3, 1945 |
| 2,422,792 | Lewis | June 24, 1947 |